US 8,250,059 B2

(12) United States Patent
Ashkenazi et al.

(10) Patent No.: US 8,250,059 B2
(45) Date of Patent: Aug. 21, 2012

(54) CRAWLING BROWSER-ACCESSIBLE APPLICATIONS

(75) Inventors: Asaf Ashkenazi, Haifa (IL); Ronen Bachar, Haifa (IL); Tamar Gelles, Haifa (IL); Adi Sharabani, Ramat Gan (IL); Ayal Yogev, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 12/558,918

(22) Filed: Sep. 14, 2009

(65) Prior Publication Data
US 2011/0066609 A1 Mar. 17, 2011

(51) Int. Cl.
*G06F 17/00* (2006.01)
(52) U.S. Cl. ............................ 707/709; 707/769; 726/25
(58) Field of Classification Search .................. 707/706, 707/713, 703, 709, 769, 770; 726/25
See application file for complete search history.

(56) References Cited

U.S. PATENT DOCUMENTS

| | | | |
|---|---|---|---|
| 6,389,436 B1* | 5/2002 | Chakrabarti et al. ......... | 715/229 |
| 6,820,111 B1 | 11/2004 | Rubin et al. | |
| 7,260,782 B2 | 8/2007 | Wallace et al. | |
| 7,536,672 B1 | 5/2009 | Ruehle | |
| 2005/0132018 A1* | 6/2005 | Milic-Frayling et al. ..... | 709/213 |
| 2006/0242606 A1 | 10/2006 | Lin | |
| 2008/0046562 A1 | 2/2008 | Butler | |
| 2009/0037394 A1* | 2/2009 | Nagarajan et al. ............ | 707/713 |
| 2009/0094249 A1 | 4/2009 | Hawkins | |
| 2010/0094856 A1* | 4/2010 | Rodrick et al. ............... | 707/706 |

OTHER PUBLICATIONS

Matter, Retro, "AJAX Crawl: Making AJAX Applications Searchable", Master Thesis, Supervised by Prof. Dr. Donald Kossman, Cristian Duda, Jul. 31, 2008, ETH, Swiss Federal Institute of Technology, Zurich.*
Burnham, B., "Saving RSS: Why Meta-Feeds Will Triumph Over Tags," [online] Burnham's Beat, Articles on Software Technology and Finance, Jan. 25, 2005, [retrieved Mar. 15, 2010] retrieved from the Internet : <http://billburnham.blogs.com/burnhamsbeat/2005/01/saving_rss_why_html>.
Duda, C., et al., "AJAX Crawl: Making AJAX Applications Searchable", [online] IEEE 25th Int'l Conf. on Data Engineering, 2009, [retrieved Feb. 18, 2010], retrieved from the Internet: <http://www.dbis.ethz.ch/research/publications/ICDE09-AjaxCrawl.pdf>.
Mesbah, A., et al. "Invariant-Based Automatic Testing of AJAX User Interfaces", Proc. of 31st Int'l Cont. on Software Engineering (ICSE '09), Research Papers, IEEE Computer Society, 2009.
Mesbah, A., et al., "Crawling AJAX by Inferring User Interface State Changes", Proc. of 8th Int'l Conf. on Web Engineering (ICWE '08), IEEE Computer Society, 2008.

(Continued)

*Primary Examiner* — Shahid Alam
(74) *Attorney, Agent, or Firm* — Elissa Y. Wang; Edell, Shapiro & Finnan, LLC

(57) ABSTRACT

Crawling a browser-accessible application by causing a target application and a bridge application to run concurrently in a browser-controllable player, and iteratively receiving from the bridge application current state information of the target application, storing the state information on a data storage device if the state information is not found on the data storage device, where the state information is stored as a descendant state of an initial state of the target application, and interacting with the target application in accordance with a predefined simulation algorithm, thereby effecting a new state of the target application, until a predefined termination condition is reached.

17 Claims, 4 Drawing Sheets

OTHER PUBLICATIONS

Adler, D., et al., "Improved Flash Indexing", [online] Official Google Webmaster Central Blog, Jun. 30, 2008, [retrieved May 26, 2009], retrieved from the Internet: <http://googlewebmastercentral.blogspot.com/2008/06/improved-flash-indexing.html>.

Corlan, M., "Deep Linking in Flex", 2008, [retrieved May 26, 2009], [online] Adobe Flex Cookbook Beta, Jun. 26, 2008, retrieved from the Internet: <http://www.adobe.com/cfusion/communityengine/index.cfm?event=showdetails&productId=2&postId=9563>.

* cited by examiner

RECEIVE INITIAL APPLICATION STATE INFO

STORE INITIAL APPLICATION STATE INFO

CURRENT STATE = INITIAL STATE

LOOPSTART:

SIMULATE NOT-YET-TRIED INTERACTION WITH APPLICATION IN ITS CURRENT STATE CAUSING THE APPLICATION STATE TO CHANGE

RECEIVE POST-INTERACTION APPLICATION STATE INFO

HAS POST-INTERACTION STATE ALREADY BEEN ENCOUNTERED?

NO:    STORE INTERACTION AND POST-INTERACTION STATE AS CHILD OF CURRENT STATE

CURRENT STATE = CHILD STATE

YES:   DO NOTHING

HAVE ALL SIMULATED INTERACTIONS WITH THE APPLICATION IN ITS CURRENT STATE BEEN TRIED?

NO:    DO NOTHING

YES:   CURRENT STATE = INITIAL STATE?

YES:   TERMINATE

NO:    RETURN TARGET APPLICATION TO PARENT STATE OF CURRENT STATE

CURRENT STATE = PARENT STATE

GOTO LOOPSTART

Fig. 3

CRAWLING BROWSER-ACCESSIBLE APPLICATIONS

FIELD OF THE INVENTION

The invention relates to navigating computer-based applications in general, and more particularly to crawling browser-accessible applications.

BACKGROUND OF THE INVENTION

"Crawling" in modern computer parlance commonly refers to traversing and cataloguing a set of related documents, such as linked Hypertext Markup Language (HTML) documents, and more recently to traversing and cataloguing the various states of applications known as Rich Internet Applications (RIAs), which are World Wide Web-based applications that are typically accessed using a computer program known as a "browser." Such crawling is useful for testing applications, among other purposes. For one type of RIA crawling may be done by manipulating an application's Universal Resource Locator (URL) and Hypertext Transport Protocol (HTTP) parameters and using different URL/HTTP parameter combinations to elicit different application states. However, for another type of RIA, such as those developed using Adobe™ Flash™ or Adobe™ Flex™ crawling may not be done by manipulating URL and HTTP parameters, as an application of this type is accessible via a single URL/HTTP parameter combination that is not specific to any one state of the application. Solutions for crawling applications of this type would therefore be advantageous.

SUMMARY OF THE INVENTION

The invention in embodiments thereof discloses novel systems and methods for crawling a browser-accessible application that is accessible via a single URL/HTTP parameter combination and whose states cannot be crawled by manipulating its URL and HTTP parameters.

In one aspect of the invention a method is provided for crawling a browser-accessible application, the method including causing a target application and a bridge application to run concurrently in a browser-controllable player, and iteratively receiving from the bridge application current state information of the target application, storing the state information on a data storage device if the state information is not found on the data storage device, where the state information is stored as a descendant state of an initial state of the target application, and interacting with the target application in accordance with a predefined simulation algorithm, thereby effecting a new state of the target application, until a predefined termination condition is reached, where the causing, receiving, storing, and interacting steps are implemented in either of a) computer hardware configured to perform the steps, and b) computer software embodied in a non-transitory, tangible, computer-readable storage medium.

In another aspect of the invention the causing step includes causing a loader application to run in the browser-controllable player, whereupon the loader application causes the target application and the bridge application to run concurrently in the browser-controllable player In another aspect of the invention the receiving step includes receiving the state information in the form of a description of the target application interfaces and their objects that the target application has made available to receive user input.

In another aspect of the invention the receiving step includes receiving the state information in the form of a description of a call made by the target application to a URL.

In another aspect of the invention the receiving step includes receiving the state information in the form of a description of a call made by the target application to another application.

In another aspect of the invention the storing step includes storing a description of any interactions performed with the target application that effected the current state.

In another aspect of the invention the interacting step includes interacting with the target application in a manner other than by manipulating URL and HTTP parameters of the target application.

In another aspect of the invention any of the steps are performed when the target application is an application developed using either of Adobe™ Flash™ or Adobe™ Flex™.

In another aspect of the invention the receiving, storing, and interacting steps are iteratively performed a plurality of times until all simulated interactions determined by the simulation algorithm have been performed with the target application.

In another aspect of the invention the method further includes iteratively performing the receiving, storing, and interacting steps until all simulated interactions determined by the simulation algorithm for performing with the target application in a given one of the states have been performed, and returning the target application to a parent state of the given state by returning the target application to its initial state and interacting with the target application in accordance with the stored interaction descriptions to effect a sequence of states from the initial state to the parent state.

In another aspect of the invention a system is provided for crawling a browser-accessible application, the system including a bridge application, and a crawling engine configured to cause a target application and the bridge application to run concurrently in a browser-controllable player, and iteratively receive from the bridge application current state information of the target application, store the state information on a data storage device if the state information is not found on the data storage device, where the state information is stored as a descendant state of an initial state of the target application, and interact with the target application in accordance with a predefined simulation algorithm, thereby effecting a new state of the target application, until a predefined termination condition is reached, where the bridge application and crawling engine are implemented in either of a) computer hardware configured to perform the functions of the browser-controllable player and crawling engine, and b) computer software embodied in a non-transitory, tangible, computer-readable storage medium.

In another aspect of the invention the crawling engine is configured to cause a loader application to run in the browser-controllable player, whereupon the loader application causes the target application and the bridge application to run concurrently in the browser-controllable player.

In another aspect of the invention the crawling engine is configured to receive the state information in the form of a description of the target application interfaces and their objects that the target application has made available to receive user input.

In another aspect of the invention the crawling engine is configured to receive the state information in the form of a description of a call made by the target application to a URL.

In another aspect of the invention the crawling engine is configured to receive the state information in the form of a description of a call made by the target application to another application.

In another aspect of the invention the crawling engine is configured to store a description of any interactions performed with the target application that effected the current state.

In another aspect of the invention the crawling engine is configured to interact with the target application in a manner other than by manipulating URL and HTTP parameters of the target application.

In another aspect of the invention the target application is an application developed using either of Adobe™ Flash™ and Adobe™ Flex™.

In another aspect of the invention the termination condition is met when all simulated interactions determined by the simulation algorithm have been performed with the target application.

In another aspect of the invention the crawling engine is configured to determine when all simulated interactions determined by the simulation algorithm for performing with the target application in a given one of the states have been performed, and return the target application to a parent state of the given state by returning the target application to its initial state and interacting with the target application in accordance with the stored interaction descriptions to effect a sequence of states from the initial state to the parent state.

In another aspect of the invention a computer program product is provided for crawling a browser-accessible application, the computer program product including a non-transitory, tangible, computer-readable storage medium, and computer program instructions operative to cause a target application and a bridge application to run concurrently in a browser-controllable player, and iteratively receive from the bridge application current state information of the target application, store the state information on a data storage device if the state information is not found on the data storage device, where the state information is stored as a descendant state of an initial state of the target application, and interact with the target application in accordance with a predefined simulation algorithm, thereby effecting a new state of the target application, until a predefined termination condition is reached, where the computer program instructions are stored on the computer-readable storage medium.

BRIEF DESCRIPTION OF THE DRAWINGS

The invention will be understood and appreciated more fully from the following detailed description taken in conjunction with the appended drawings in which:

FIG. 3 is a simplified pseudocode illustration of a method for storing the states of browser-accessible applications, operative in accordance with an embodiment of the invention.

DETAILED DESCRIPTION OF THE INVENTION

Figure 1:
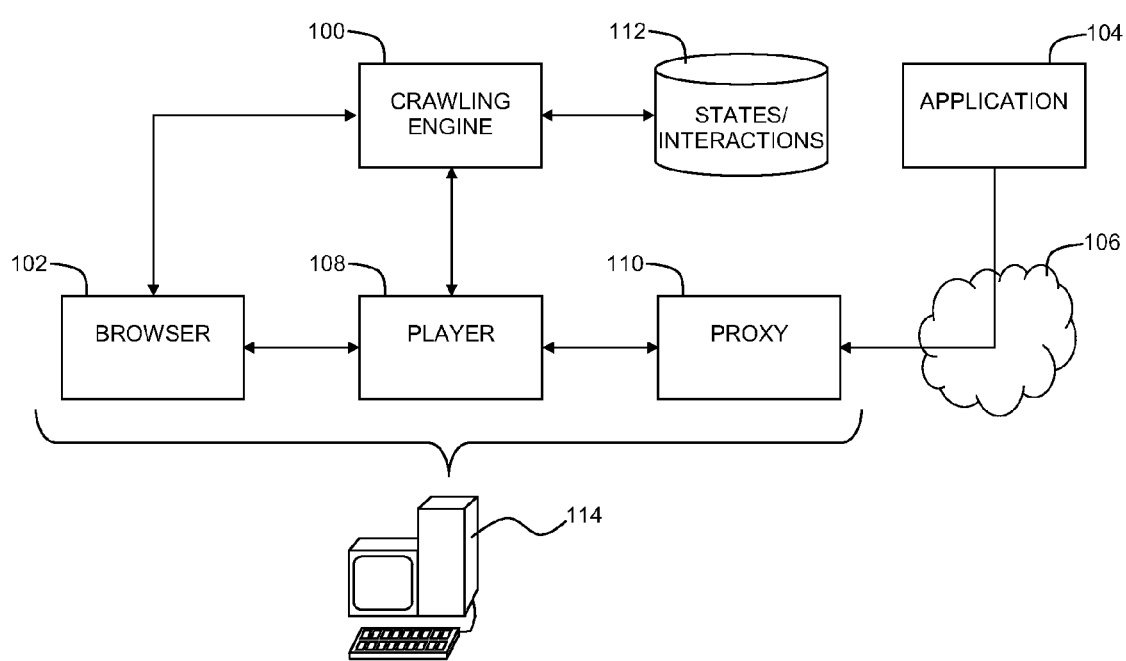
FIG. 1 is a simplified conceptual illustration of a system for crawling browser-accessible applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flow-chart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for crawling browser-accessible applications, constructed and operative in accordance with an embodiment of the invention. In the system of FIG. 1, a crawling engine 100 causes a browser 102 to attempt to access an application 104. In one embodiment application 104 is an application developed using Adobe™ Flash™ or Adobe™ Flex™, commercially available from Adobe Systems Incorporated, San Jose, Calif., and is accessible via a computer network 106, such as the Internet, using a single URL/HTTP parameter combination and whose states cannot be crawled by manipulating its URL and HTTP parameters. Browser 102, such as Internet Explorer™ version 8.0, commercially available from Microsoft Corporation, Redmond, Wash., includes or otherwise causes a player 108 to attempt to run application 104. Player 108, such as Adobe™ Flash™ Player 10, commercially available from Adobe Systems Incorporated, preferably requests access to application 104 from a proxy 110 which provides player 108 with access to application 104 as well as other support applications as is described in greater detail hereinbelow. Player 108 provides crawling engine 100 with information describing various states of application 104, while crawling engine 100 performs simulated user interactions on application 104 when application 104 is run by player 108, where different interactions elicit different states of application 104. Crawling engine 104 preferably stores the information regarding the various states, as well as the interactions that elicited the states, in a data store 112. In one embodiment, any communications described herein between elements other than browser 102 are actually communications with browser 102, where browser 102 acts as an intermediary between the communicating elements, although such communications may, for the sake of brevity, be described herein as direct communications between communicating elements without involving browser 102.

Figure 2:
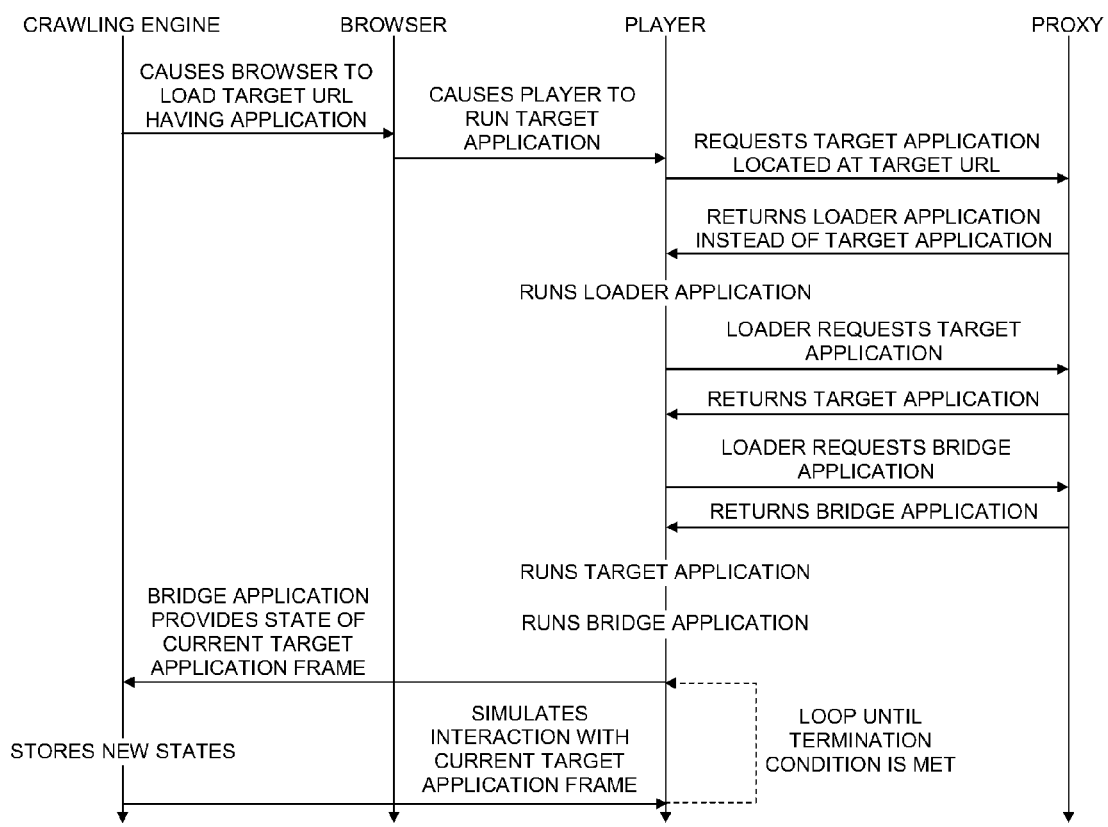
FIG. 2 is a simplified sequence diagram of a method for crawling browser-accessible applications, operative in accordance with an embodiment of the invention.

Reference is now made to FIG. 2, which is a simplified sequence diagram of a method for crawling browser-accessible applications, operative in accordance with an embodiment of the invention. The method of FIG. 2 may be used to operate the system of FIG. 1, where the crawling engine, browser, player, proxy, and target application referred to in FIG. 2 represent crawling engine 100, browser 102, player 108, proxy 110, and application 104 of FIG. 1 respectively. In the method of FIG. 2, a crawling engine causes a browser, such as Internet Explorer™, to load a target URL where a target application is located. The browser instructs the player to access the target application, whereupon the player requests the target application from the proxy. Instead of returning the target application to the player, the proxy returns a loader application which the player then runs. The loader application then requests the target application from the proxy, and the proxy returns the target application to the player. The loader application also requests a bridge application from the proxy, and the proxy returns the bridge application to the player. The player runs both the target application and the bridge application, preferably after the loader application terminates.

In one embodiment, the target, loader, and bridge applications of FIG. 2 are all Adobe™ Flash™ applications and the player is an Adobe™ Flash™ player.

The bridge application provides the crawling engine with the current state of the target application, such as in the form of a description of the target application interfaces and their objects that the application has made available to receive user input, and/or calls made by the target application to URLs and other applications as well. For example, where the target application is an Adobe™ Flash™ application, the bridge application provides the crawling engine with a mapping of all GUI objects, such as buttons, movie clips, and text fields that appear in the current frame of the target application as run by the player. In another example, when the crawling engine simulates a mouse click on a link in the target application, causing the browser to receive an event instructing it to open the URL in a new window or in the same window. The crawling engine preferably stores on a data storage device each new target application state that it encounters, such as in the form of a logical data tree where the initial state of the target application is stored in a root node in the tree, and additional child, grandchild, etc. nodes are added to the tree in which target application states that descend from initial state are stored. The crawling engine simulates interactions with the target application in accordance with a predefined simulation algorithm, such as by simulating mouse clicks on target application interface objects and filling in input fields, and preferably catches calls made by the target application to URLs and other applications as well. When the simulated interactions with the target application result in a change to the current state of the target application, the bridge application provides the crawling engine with the new state of the target application. The crawling engine preferably continues to simulate interactions with the target application and store new target application states until a predefined termination condition is reached, such as where all the simulated interactions determined by the predefined simulation algorithm have been performed with the target application.

Reference is now made to FIG. 3, which is a simplified pseudocode illustration of a method for storing the states of browser-accessible applications, operative in accordance with an embodiment of the invention. The method of FIG. 3 may be used to operate crawling engine 100 of FIG. 1. In the method of FIG. 3, a description of the initial state of a browser-accessible application is received and stored, such as on a data storage device in a root node of a logical data tree. A predefined simulation algorithm determines an interaction that is to be performed on the target application in its current state. A simulated interaction that has not yet been performed on the application in its current state is performed on the application, causing the application state to change. A description of the post-interaction state of the application is received and, if this application state has not yet been stored, the post-interaction state is stored, preferably together with a description of the simulated interaction, in a child relationship with the pre-interaction state, such as in a child node of the current parent node of the data tree, where all states/nodes are stored in a descendent relationship with the initial state/root node. If all simulated actions have been performed on the application for a given child state, the application is returned to its parent state, such as by returning the application to its initial state and simulating interactions with the application as required to effect the sequence of stored states from the initial state to the desired state. The above process is preferably performed until a predefined termination condition is reached, such as where all simulated actions have been performed on the application with respect to its initial state.

It will be appreciated that any aspect of the invention described hereinabove may be implemented as a computer program product embodied in a computer-readable medium, such as in the form of computer program instructions stored on magnetic, optical, or other physical storage media or embedded within computer hardware, and may be executed by or otherwise made accessible to a computer 114 (FIG. 1).

Figure 4:
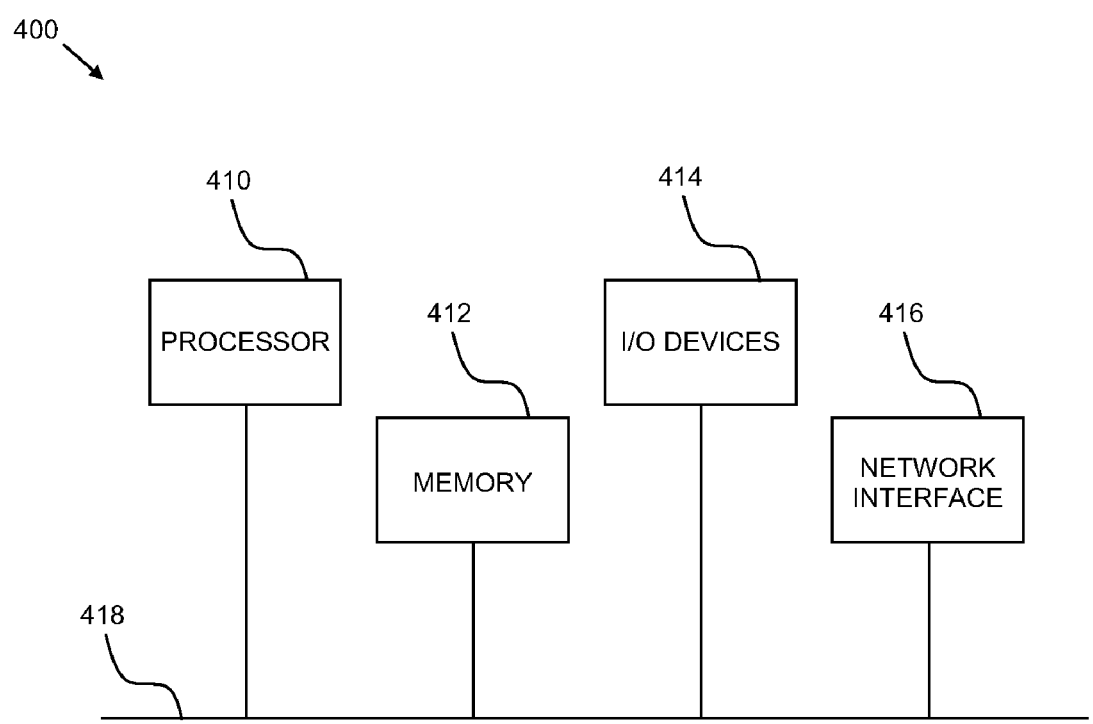
FIG. 4 is a simplified block diagram illustrating an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for crawling a browser-accessible application, the method comprising:
   causing a target application and a bridge application to run concurrently in a browser-controllable player; and iteratively performing steps until a predefined termination condition is reached, wherein the steps include:
   receiving from said bridge application current state information of said target application;
   storing said state information on a data storage device if said state information is not found on said data storage device, wherein said state information is stored as a descendant state of an initial state of said target application, wherein said storing step comprises storing a description of any interactions performed with said target application that effected said current state; and
   interacting with said target application in accordance with a predefined simulation algorithm, thereby effecting a new state of said target application;
   wherein said causing, receiving, storing, and interacting steps are implemented in one of:
   a) computer hardware configured to perform said steps; and
   b) computer software embodied in a non-transitory, tangible, computer-readable storage medium;
   iteratively performing said receiving, storing, and interacting steps until all simulated interactions determined by said simulation algorithm for performing with said target application in a given one of said states have been performed; and
   returning said target application to a parent state of said given state by returning said target application to its initial state and interacting with said target application in accordance with said stored interaction descriptions to effect a sequence of states from said initial state to said parent state.

2. A method according to claim 1 wherein said causing step comprises causing a loader application to run in said browser-controllable player, whereupon said loader application causes said target application and said bridge application to run concurrently in said browser-controllable player.

3. A method according to claim 1 wherein said receiving step comprises receiving said state information in the form of a description of said target application interfaces and their objects that said target application has made available to receive user input.

4. A method according to claim 1 wherein said receiving step comprises receiving said state information in the form of a description of a call made by said target application to a URL.

5. A method according to claim 1 wherein said receiving step comprises receiving said state information in the form of a description of a call made by said target application to another application.

6. A method according to claim 1 wherein said interacting step comprises interacting with said target application in a manner other than by manipulating URL and HTTP parameters of said target application.

7. A method according to claim 1 wherein any of said steps are performed when said target application is an application developed using either of Adobe™ Flash™ or Adobe™ Flex™.

8. A method according to claim 1 wherein said receiving, storing, and interacting steps are iteratively performed a plurality of times until all simulated interactions determined by said simulation algorithm have been performed with said target application.

9. A system for crawling a browser-accessible application, the system comprising:
   a bridge application; and
   a crawling engine configured to cause a target application and said bridge application to run concurrently in a browser-controllable player, and iteratively perform functions until a predefined termination condition is reached, wherein the functions are configured to:
      receive from said bridge application current state information of said target application;
      store said state information on a data storage device if said state information is not found on said data storage device, wherein said state information is stored as a descendant state of an initial state of said target application, wherein said storing comprises storing a description of any interactions performed with said target application that effected said current state; and
      interact with said target application in accordance with a predefined simulation algorithm, thereby effecting a new state of said target application;
   wherein said crawling engine is further configured to:
      determine when all simulated interactions determined by said simulation algorithm for performing with said target application in a given one of said states have been performed; and
      return said target application to a parent state of said given state by returning said target application to its initial state and interacting with said target application in accordance with said stored interaction descriptions to effect a sequence of states from said initial state to said parent state;
   wherein said bridge application and crawling engine are implemented in one of:
      a) computer hardware configured to perform the functions of said browser-controllable player and crawling engine; and
      b) computer software embodied in a non-transitory, tangible, computer-readable storage medium.

10. A system according to claim 9 wherein said crawling engine is configured to cause a loader application to run in said browser-controllable player, whereupon said loader application causes said target application and said bridge application to run concurrently in said browser-controllable player.

11. A system according to claim 9 wherein said crawling engine is configured to receive said state information in the form of a description of said target application interfaces and their objects that said target application has made available to receive user input.

12. A system according to claim 9 wherein said crawling engine is configured to receive said state information in the form of a description of a call made by said target application to a URL.

13. A system according to claim 9 wherein said crawling engine is configured to receive said state information in the form of a description of a call made by said target application to another application.

14. A system according to claim 9 wherein said crawling engine is configured to interact with said target application in a manner other than by manipulating URL and HTTP parameters of said target application.

15. A system according to claim 9 wherein said target application is an application developed using either of Adobe™ Flash™ and Adobe™ Flex™.

16. A system according to claim 9 wherein said termination condition is met when all simulated interactions determined by said simulation algorithm have been performed with said target application.

17. A computer program product for crawling a browser-accessible application, the computer program product comprising:
   a non-transitory, tangible, computer-readable storage medium; and
   computer program instructions operative to:
      cause a target application and a bridge application to run concurrently in a browser-controllable player, and iteratively perform functions until a predefined termination condition is reached, wherein the functions are configured to:
         receive from said bridge application current state information of said target application;
         store said state information on a data storage device if said state information is not found on said data storage device, wherein said state information is stored as a descendant state of an initial state of said target application, wherein said storing comprises storing a description of any interactions performed with said target application that effected said current state; and
         interact with said target application in accordance with a predefined simulation algorithm, thereby effecting a new state of said target application;
      iteratively perform said receiving, storing, and interacting functions until all simulated interactions determined by said simulation algorithm for performing with said target application in a given one of said states have been performed; and
      return said target application to a parent state of said given state by returning said target application to its initial state and interacting with said target application in accordance with said stored interaction descriptions to effect a sequence of states from said initial state to said parent state;
   wherein said computer program instructions are stored on said computer-readable storage medium.

* * * * *